Dec. 29, 1953     A. V. L. C. DEBRIE     2,664,037
EXPOSURE AND FILM-FEEDING CONTROL
DEVICE FOR PHOTOGRAPHIC CAMERAS

Filed May 10, 1950     3 Sheets-Sheet 1

INVENTOR:
ANDRE VICTOR LEON
CLEMENT DEBRIE
BY

Dec. 29, 1953  A. V. L. C. DEBRIE  2,664,037
EXPOSURE AND FILM-FEEDING CONTROL
DEVICE FOR PHOTOGRAPHIC CAMERAS
Filed May 10, 1950  3 Sheets-Sheet 3
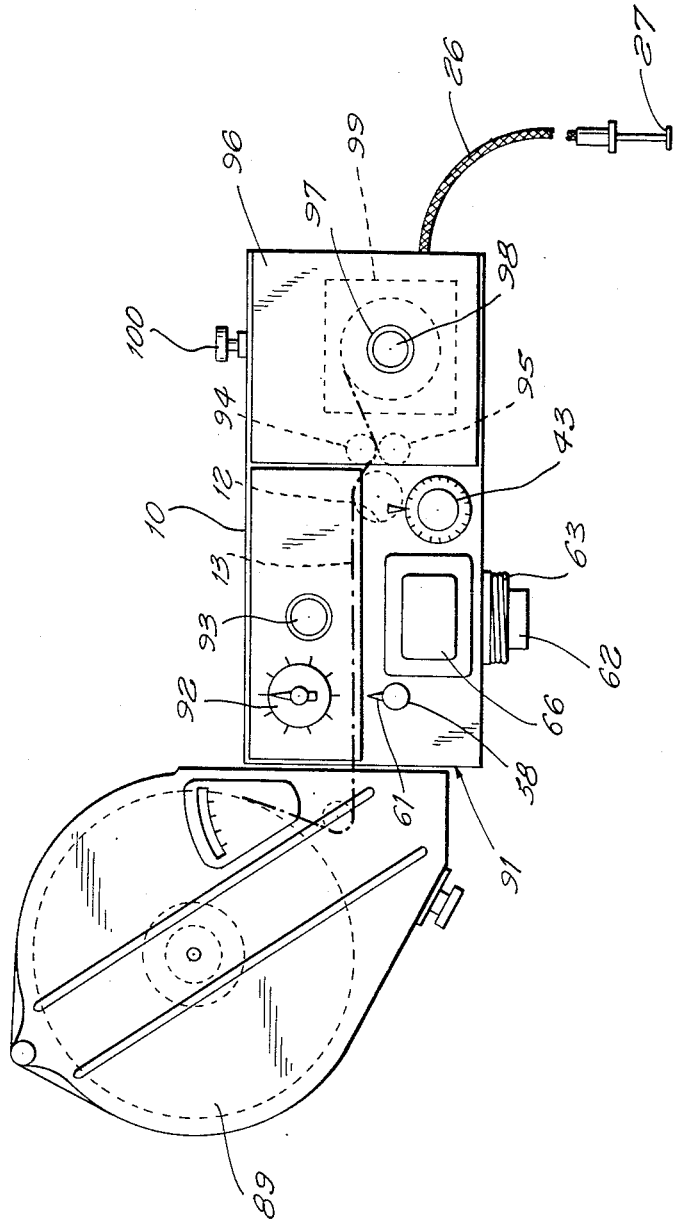
INVENTOR:
ANDRE VICTOR LEON
CLEMENT DEBRIE
BY Patented Dec. 29, 1953

2,664,037

UNITED STATES PATENT OFFICE 2,664,037

EXPOSURE AND FILM-FEEDING CONTROL DEVICE FOR PHOTOGRAPHIC CAMERAS

André Victor Leon Clement Debrie, Paris, France

Application May 10, 1950, Serial No. 161,155

Claims priority, application France May 21, 1949

11 Claims. (Cl. 95—11)

This invention relates to photographic camera exposure and film-feeding control devices and more particularly to a photographic shutter releasing and closing device driven at a constant speed by a motor and arranged to provide variable and relatively long times of exposure with great regularity, this device acting automatically after an initial release and retracting at the end of its stroke the image impressed on the film by feeding the latter by either a single- or double-image interval, the device being subsequently brought to its starting position automatically, while the motor is constantly kept running and the device ready for another operation.

A description of the device according to the invention is given below with reference to the accompanying drawings showing diagrammatically by way of example one possible embodiment of the invention.

In the drawings:

Fig. 4 is an external view of a micro-film photographic camera fitted with the various adjusting or releasing members of the device according to the invention, which is particularly suitable for this type of photographic camera.

In the different figures of the drawings similar members are designated with the same numeral references.

Fig. 1 shows diagrammatically the shutter and film-feeding control device during the shutter-opening step.

Figure 1:
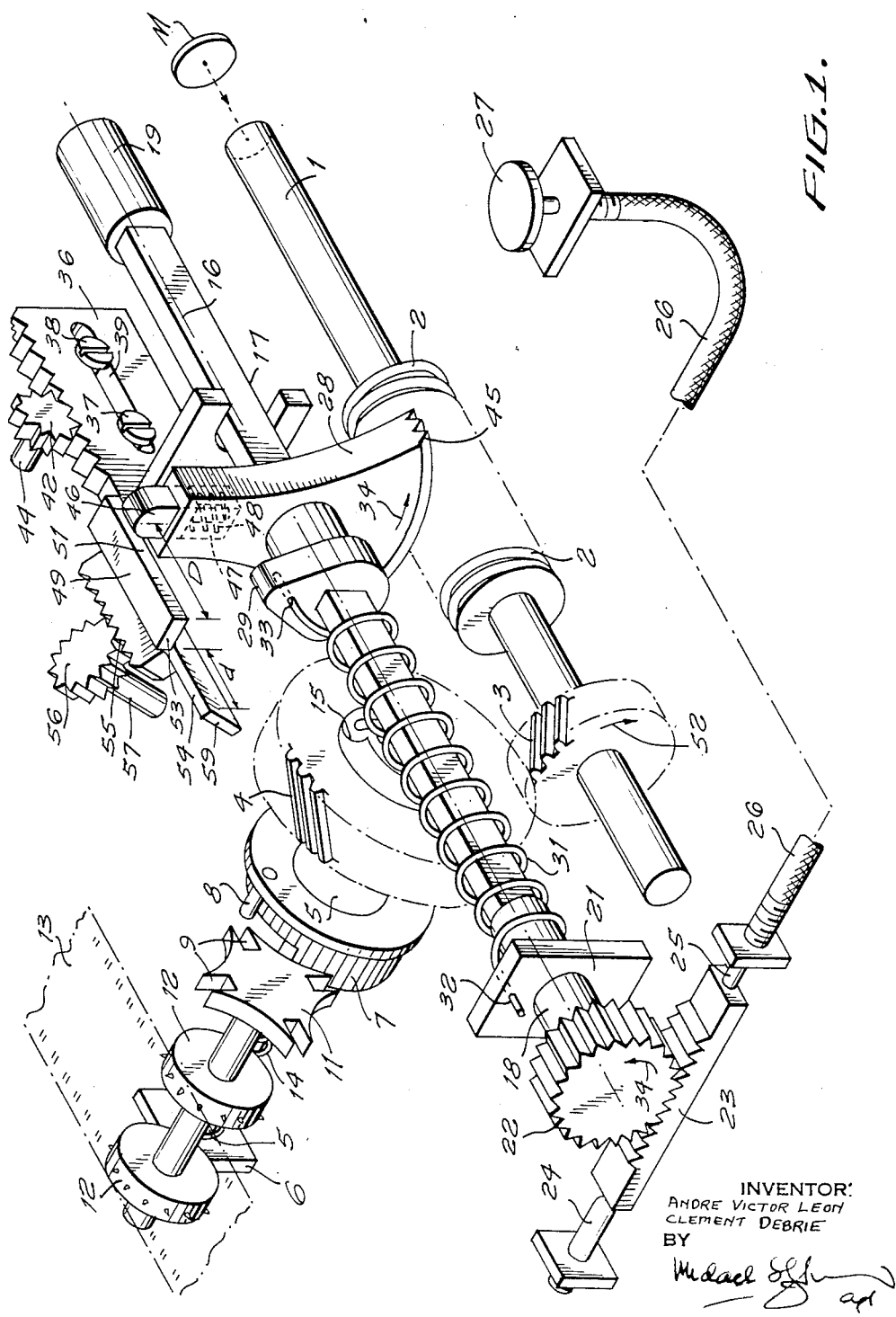
Fig. 1 is a diagrammatic perspective view of the device.

A motor M, which may be of any suitable or known type, drives at a constant speed a shaft 1 fast with a worm 2 and a worm pinion 3 in constant meshing engagement with a helical wheel 4 which drives a shaft 5 journaled in fixed portions or members, such as 6, of the camera or structure.

This shaft 5 is mounted for sliding motion through wheel 4 while the latter is secured against axial motion in relation to the camera structure by known means not shown. This shaft is fast with a locking drum 7 provided with a pin 8 for driving the star-wheel 11 of a Geneva movement when pin 8 is introduced into one of the slots 9 thereof. The star-wheel 11 is fast with the shaft of a pair of film-engaging sprocket-wheels 12 which will feed the film 13 when they are actuated by the Geneva movement.

Shaft 5 is surrounded by a helical spring 14 which continuously urges, on the one hand, driving pin 8 out from slots 9 of star-wheel 11 which in this position is held against motion by its locking drum 7 and, on the other hand, the end of shaft 5 out from wheel 4 on its side opposite to 7. This end of shaft 5 is provided with a cam face 16 which, as will be made clear presently, is adapted to move the assembly consisting of shaft 5, drum 7 and pin 8 in the opposite axial direction while compressing spring 14.

The extension of the axis of shaft 5 and wheel 4 meets the axis 16 of shaft 17 provided at both ends with journals 18, 19 rotating in fixed bearings such as 21. The axis of rotation of shaft 17 is parallel with shaft 1.

Shaft 17 is prismatic and may have a square or other suitable cross-section providing a guiding surface between its journals 18 and 19.

Shaft 17 has fixed coaxially thereon at one end a pinion 22 meshing with a toothed rack 23 cooperating with the push rod 24 of a shutter or any other motion-transmitting device equivalent thereto. This rod 24 is constantly urged in a resilient manner against rack 23.

Rack 23 may be urged in the opposite side by another push rod 25 actuated by the operator, for instance by means of a flexible-wire shutter release controlled by depressing a push-button 27. A sector 28 and a cam member 29 fast with each other are mounted on shaft 17 for sliding axial motion therealong and rotation therewith.

A spiral spring 31 wound around shaft 17 bears at one end against bearing 21 and at the other end against cam member 29 so as to urge them away from each other.

Besides, the ends 32 and 33 of spring 31 are fast with members 21 and 29, respectively.

Thus, as the spring is continuously and suitably tensioned about its axis before its ends are made fast with members 21 and 29, it follows that sector 28, cam member 29 and pinion 22 are constantly urged for anti-clockwise rotation, i. e. in the direction shown by the arrow 34.

The axial displacement of assembly 28, 29 in the direction of journal 19, due to the resilient action of the compressed spring 31 when it is released, is restricted by the abutment of member 29 against a fork member 35. The fork 35 is carried by a member 36 fixed for sliding motion on the structure or casing 10 (Fig. 4) of the photographic camera for instance through the intermediary of a pair of screws 37, 38 provided with a cylindrical bearing portion fitting slidably in a parallel-edged slot 39 of member 36.

The movements of member 36 and abutment 35 in a direction parallel with the axis 16 may be transmitted through a toothed rack 41 meshing with a pinion 42 actuated by an external control button 43 (Fig. 4) for adjusting the time of exposure through a shaft 44.

The circular portion 45 of sector 28 carries screw-threads of same pitch as worm 2 so as to mesh therewith when the sector is moved angularly.

At the end opposite to the circular screw-threaded portion 45 sector 28 has a resiliently retractable spring-loaded pin 46 guided in a chamber 47 formed in sector 28 and containing a spring 48.

In inoperative condition sector 28 is urged against abutment 35 by spring 31, its screw-threaded portion 45 is disengaged from worm 2, and spring-pin 46 is released under a fixed abutment slide illustrated at 49 and having a guide face 51 parallel with axis 16. Spring pin 46 is adapted to bear laterally against this guide-face 51 when the circular portion 45 of the sector is meshing with worm 2.

The fixed slide 49 is supported in any suitable manner (not shown) by the structure 10 of the apparatus.

When sector 28 meshes with worm 2 through its screw-threaded portion 45 it is driven to the left, as seen in Fig. 1, together with member 28 and, owing to the combined action of the rotating worm 2 in the direction of the arrow 52 and of the torque reaction of spring 31 in the direction of arrows 34, spring-pin 46 is pressed against face 51.

When spring-pin 46 moves beyond the end face 53 of slide 49 it springs to the left, as seen in Fig. 1, owing to the resilient torque reaction of spring 31 whereby shaft 17 and therefore pinion 22 are moved angularly in the direction of arrows 34. This movement however is restricted by the presence of another slide 54 engaged by pin 46 and movable in a direction parallel with axis 16 along the structure or frame 10 of the apparatus by suitable means not shown. The displacements of member 54 may be transmitted thereto for example through a rack-and-pinion device 55, 56. Pinion 56 is actuated by a button 58 (Fig. 4) through a common shaft 57 journaled in the wall of the camera.

This button 58 is a means of modifying the size and length of the retracted portion of the film, as will be made clear presently.

Sector 28 is kept in meshing engagement with worm 2 until spring pin 46 escapes from the end 59 of the abutment-slide 54 and meanwhile the sector is therefore rotatably driven by the worm driven in turn by the motor M, whereby spring 31 is compressed by the rotating sector.

The positions of member 54 and end face 59 thereof are defined by two abutments corresponding to two different image sizes on the film. Thus, for example, when a 35 mm. film is used the conventional sizes 24 x 18 mm. and 24 x 36 mm. are selected by positioning the size-control button 58 (Fig. 4) in accordance with the indications of an index 61.

A combination of the above-described device with a micro-film photographic camera is described below as a preferred embodiment of the invention. The mechanism as described is fitted in the casing or structure 10 of the camera which is provided with its lens having the usual focusing and shutter-adjusting devices. This lens is surrounded by a collar member 63 for fixing, for instance by screwing, the camera on a supporting device above the documents or objects to be reproduced. Preferably, the motor M for driving shaft 1 is fixed on the back wall of the camera.

A shutter of a type particularly suitable for actuation by the movements of rack 23 and push-rod 24 may be constructed as follows (Figs. 2 and 3):

A chamber 64, acting as a camera obscura in which the shutter is moved, is provided with a centering window or frame 65 having a depth variable through known means from 18 to 36 mm., the film shown diagrammatically as 13 being moved, guided and pressed before this frame in the conventional manner.

A window fitted with a focusing screen 66, for example of ground glass, is provided in the front side of the structure 10 of the apparatus.

The shutter consists of a cylinder portion 67 connected through a portion 68 parallel with a radial plane to a shaft 69 which coincides with the fulcrum of the curved surface 67, this portion 68 being parallel with the focusing screen 66 and at right angles with the plane of film 13.

Figure 2:
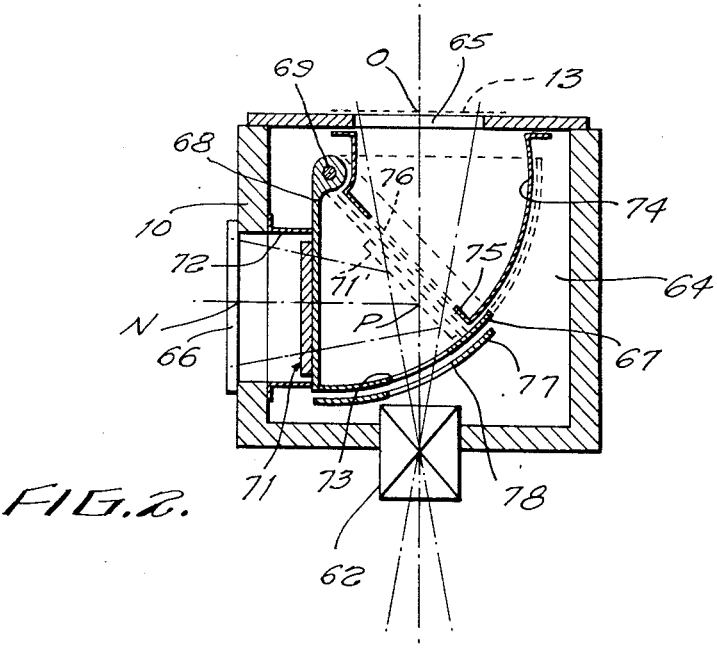
Fig. 2 is an elevational cross-section of a shutter combined with a "reflex" view-finder which is particularly suitable for operation with the control device according to the invention.

The external face of portion 68 carries a plane mirror 71 and may be positioned to prevent any light from penetrating into chamber 64 through the ground glass plate 66 when the external face thereof is urged in the position of Fig. 2 against the tubular abutment 72 behind plate 66.

In this position an aperture 73 formed in the cylindric portion 67 uncovers the lens 62.

Moreover, light is prevented from entering the camera by means of a screening device 74 fixed around the aperture 65 and having in its inner wall 75 a passage 76 for the light beam, this passage being closed by member 68 when the latter is lifted with its mirror 71 to the position shown in dotted lines in 71', i. e. inclined by 45° in relation to the optical axis.

By suitably dimensioning the different members involved, in this position we have $$OP = PN$$

wherein

P = the point in which the optical axis intersects 71', and
O, N = the points of intersection of the optical axis with the film 13, and of the reflexion at 90° of this optical axis with the focusing screen 66, respectively.

Light-tightness is further obtained by the provision of a cylindric screen 77 positioned between shutter 67 and lens 62, and having a passage 78 for the light beam, and also side screens (not shown).

In inoperative conditions the member 68 and the cylindric shutter and mirror assembly are abutted in their upper position against the wall 75 by means of a traction spring 79 actuating a lever 81 pivotally mounted at 82 on the casing so as to drive a pin 84 carried by a member 85 fast with member 68 endwise of shaft 69 into a slot 83. In this position lever 81 is urged against stop member 86 whereby the shutter is closed and the image transmitted through the lens formed on the ground glass 66 where it is conveniently observed both for centering and focusing purposes.

Figure 3:
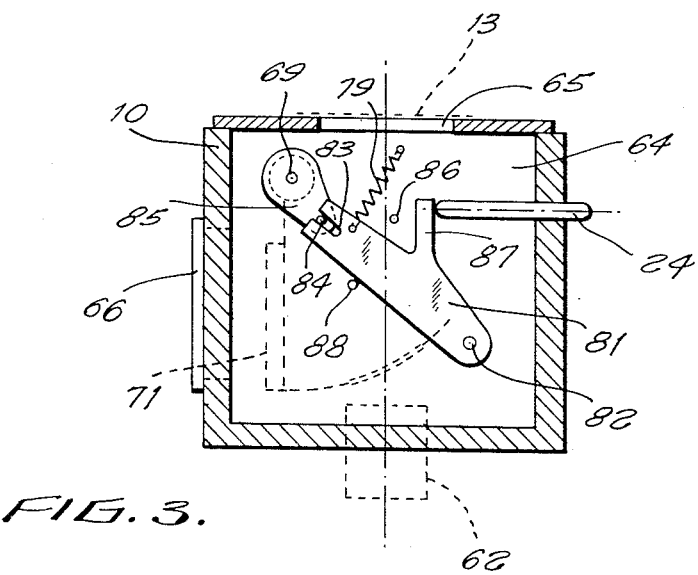
Fig. 3 is another elevational cross-section showing the connecting members between the control device and the aforesaid shutter.

Fig. 3 illustrates the condition of the mechanism when the shutter is open.

To open the shutter the lever 81 is rocked anticlockwise by actuating the push-rod 24 which presses an arm 87 of lever 81 until the latter abuts against another stop member 88 carried by the casing or side wall of the camera.

As shown in the figure, lever 81 is lowered against the resiliency of spring 79 and mirror 71 closes the inner end of the tubular screen 72 while aperture 73 surrounds now the light beam which is thus allowed to impress the film 13.

Furthermore, the apparatus is provided with a feeding magazine 89 of known type fixed for example on one side 91 of the camera.

The front surface of the apparatus is fitted with the two-way switching button 58 for selecting the desired image size, the view-finder focusing screen 66 of ground glass, the milled knob 43 for adjusting the time of exposure, an image counter 92 and a button 93 for opening the casing 10 of the camera in order to position the film 13 above the image aperture and cause it to mesh with the Geneva movement sprocket-wheels 12.

According to the conventional practice, a pair of rollers 94, 95 are provided for introducing the film in a light-tight manner into a compartment 96 which may be opened and contains the winding spool 97 the shaft of which is driven at the same time as the film is fed, in the known manner. A knob 98 is fitted on the front side of this chamber for hand-winding purposes.

This winding spool is preferably wound in a light-tight receiving box shown diagrammatically at 99 in dotted lines and disclosed in my patent application, Serial No. 161,154, filed May 10, 1950, for "Improvements in film-receiving magazine-box," now Patent No. 2,644,646, issued July 7, 1953.

The arrangement further comprises a locking device 100 controlled from the outside for closing the magazine-box 99 so as to make it possible to extract it in broad daylight from compartment 96.

In this case the assembly described operates as follows:

In inoperative conditions sector 28 is rocked and urged against the fork member 35. Shaft 1 is driven at a constant speed.

The operator, by actuating knob 43 and therefore pinion 42 and rack 41, moves the assembly consisting of fork 35 and sector 28 in order to adjust the distance D along which spring pin 46 will be permitted to engage face 51 of the fixed slide 49.

This distance D corresponds to a well-defined time T of transmission of motion by worm 2.

Similarly, the operator has adjusted by means of the two-way switching button 58 the distance d between faces 53 and 59 after which the spring-pressed pin 46 will be released from the adjustable slide 54.

Then, when the push-button 27 of the shutter-release 26 is depressed, rack 23 is moved to the left (Fig. 1) and carries along pusher 24, thus closing the view-finder 66 and allowing the light beam to flow toward the film 13. The exposure begins.

At the same time, this displacement of rack 23 rotates pinion 22, shaft 17 and sector 28 in a clockwise direction, i. e. opposite to that shown by the arrows 34. The spring-pressed pin 46 trips out in front of slide 51, spring 31 is wound by this torsional movement, screw-threads 45 are caused to mesh with worm 2 and the assembly 28, 29 and 46 is driven at a constant speed in the axial direction of bearing 21.

By immediately removing the finger from button 27 the spring-pressed pin 46 holds shaft 17 and pinion 22 against rotation and rack 23 is also held in the position in which it pushes member 24 and therefore keeps the shutter open.

The exposure continues as long as pin 46 is in sliding engagement with face 51 during a time T after which it escapes at 53. Then, the assembly 28, 29, 17 and 22 is moved angularly in the direction of the arrows 34 whereby rack 23 is moved back sufficiently to close the shutter by the return of push rod 24. The exposure is ended.

The duration of the exposure depends from the distance D adjustable through fork 35 by means of knob 43. Thus, any continuous variation of the time of exposure may be obtained within practically pre-determined limits.

This first angular movement brings cam member 29 in contact with cam face 15 provided endwise of shaft 5.

When cam face 15 is engaged by cam member 29, and provided that both timing and profiles are correctly made, the driving pin 8, which has been moved axially and rotates with wheel 4, engages a slot 9 on star-wheel 11, and rotates the latter by 90° so that sprocket-wheels 12 of the feeding device will feed film 13 by one interval. Assuming that the distance d is adjusted at its minimum value, spring-pin 46 will travel along this distance within a shorter period that required for one revolution of cam member 15 corresponding to another operation of the Geneva movement, and as pin 46 reaches face 59 before this other operation occurs, sector 28 is rocked back in the direction of the arrow 34 and disengaged from worm 2, together with cam member 29, owing to the torque reaction of spring 31, until sector 28 engages fork 35. In this position the device is ready for another operation.

The film feed corresponding to ¼ of revolution of the Geneva movement 11 driving the film feeding device 12 may be, for example, 18 mm. (18 x 24 mm. size). If the distance d between 53 and 59 had been adjusted to its maximum value, cam face 15 would have engaged another time cam member 29 kept in operative position by the engagement of pin 46 on slide 54, whereby another 18 mm. feed would have been imparted to the film by sprocket wheels 12. In this case the resulting film feed would correspond to a 24 x 36 mm. size image.

Through known means (not shown) the displacement of rack 35 is accompanied by the necessary enlargement lengthwise in accordance with the size, indicated by the index of knob 58, of the view-taking aperture.

With the above-described mechanism it is therefore possible to afford an accurate, simple and continuous adjustment of the times of exposure, and also to feed film in several sizes, as a rule 18 x 24 mm. and 24 x 36 mm.

It will be understood that the affixed drawings are only diagrammatic illustrations of the various mechanisms which form the apparatus and that many modifications may be brought thereto without departing from the spirit and scope of the invention.

What I claim is:

1. In a camera, in combination, shutter operating means movable between shutter opening and shutter closing positions; releasable holding means operatively connected to said shutter operating means for holding the same in said shutter opening position for a predetermined length of time; film feeding means operatively connected to said releasable holding means to be actuated thereby; and adjusting means operatively connected to said releasable holding means to enable the latter to control said film feeding means so as to feed a predetermined length of film.

2. In a camera, in combination, shutter operating means movable between shutter opening and shutter closing positions; releasable holding means operatively connected to said shutter operating means for holding the same in said shutter opening position for a predetermined length of time, said releasable holding means comprising a stationary guide member, a movably mounted element located adjacent to said guide member, spring means connected to said movably mounted element for urging the same into engagement with said guide member, moving means connected to said movably mounted element for moving the same along said guide member, and adjustably mounted stop means operatively connected to said releasable holding means for controlling the duration of contact between said movably mounted element and said guide member; film feeding means operatively connected to said releasable holding means to be actuated thereby; and adjusting means operatively connected to said releasable holding means to enable the latter to control said film feeding means so as to feed a predetermined length of film.

3. In a camera, in combination, shutter operating means movable between shutter opening and shutter closing positions; releasable holding means operatively connected to said shutter operating means for holding the same in said shutter opening position for a predetermined length of time; film feeding means operatively connected to said releasable holding means to be actuated thereby, said film feeding means comprising a first rotatably mounted shaft, a second rotatably mounted shaft spaced from and parallel to said first shaft and being mounted for movement along its axis, disengageable Geneva drive means mounted on said first and second shafts, said Geneva drive means being engaged when said second shaft is moved in one direction along its axis and being disengaged when said second shaft is moved in a direction opposite to said one direction along its axis, resilient means operatively connected to said second shaft for urging the same in said opposite direction, and cam means operatively connected to said releasable holding means for moving said second shaft in said one direction so as to engage said Geneva drive means to feed the film; and adjusting means operatively connected to said releasable holding means to enable the latter to control said film feeding means so as to feed a predetermined length of film.

4. In a camera, in combination, shutter operating means movable between shutter opening and shutter closing positions; releasable holding means operatively connected to said shutter operating means for holding the same in said shutter opening position for a predetermined length of time, said releasable holding means comprising a stationary guide member, a movably mounted element located adjacent to said guide member, spring means connected to said movably mounted element for urging the same into engagement with said guide element, moving means connected to said movably mounted element for moving the same along said guide element, and adjustably mounted stop means operatively connected to said releasable holding means for controlling the duration of contact between said movably mounted element and said guide member; film feeding means operatively connected to said releasable holding means to be actuated thereby, said film feeding means comprising a first rotatably mounted shaft, a second rotatably mounted shaft spaced from and parallel to said first shaft and being mounted for movement along its axis, disengageable Geneva drive means mounted on said first and second shafts, said Geneva drive means being engaged when said second shaft is moved in one direction along its axis and being disengaged when said second shaft is moved in a direction opposite to said one direction along its axis, resilient means operatively connected to said second shaft for urging the same in said opposite direction, and cam means operatively connected to said releasable holding means for moving said second shaft in said one direction so as to engage said Geneva drive means to feed the film; and adjusting means operatively connected to said releasable holding means to enable the latter to control said film feeding means so as to feed a predetermined length of film.

5. In a camera, in combination, shutter operating means movable between shutter opening and shutter closing positions; releasable holding means operatively connected to said shutter operating means for holding the same in said shutter opening position for a predetermined length of time, said releasable holding means comprising a stationary guide member, a movably mounted element located adjacent to said guide member, spring means connected to said movably mounted element for urging the same into engagement with said guide element, moving means connected to said movably mounted element for moving the same along said guide element, and adjustably mounted stop means operatively connected to said releasable holding means for controlling the duration of contact between said movably mounted element and said guide member; film feeding means operatively connected to said releasable holding means to be actuated thereby, said film feeding means comprising a first rotatably mounted shaft, a second rotatably mounted shaft spaced from and parallel to said first shaft and being mounted for movement along its axis, disengageable Geneva drive means mounted on said first and second shafts, said Geneva drive means being engaged when said second shaft is moved in one direction along its axis and being disengaged when said second shaft is moved in a direction opposite to said one direction along its axis, resilient means operatively connected to said second shaft for urging the same in said opposite direction, and cam means operatively connected to said releasable holding means for moving said second shaft in said one direction so as to engage said Geneva drive means to feed the film; and adjusting means operatively connected to said releasable holding means to enable the latter to control said film feeding means so as to feed a predetermined length of film, said adjusting means comprising a second guide member located adjacent to said first-mentioned guide member and being movably mounted so as to have a predetermined length thereof extending beyond said first-mentioned guide member, said spring means urging said movably mounted element into engagement with said second guide member after said movably mounted element moves beyond said first-mentioned guide member.

6. In a camera, in combination, a shutter operating means movable between a shutter opening position and a shutter closing position; a rotatably mounted shaft operatively connected to said shutter operating means for moving the same between said two positions, said shaft being rotatable in one direction to move said shutter operating means into said shutter opening position and being rotatable in a direction opposite to said one direction for moving said shutter opening means into said shutter closing position; spring means operatively connected to said shaft for urging the same in said opposite direction of rotation; stationary guide means located adjacent to said shaft and having a guide surface extending in a direction parallel to said shaft; pin means mounted on said shaft only for sliding movement along the length thereof, said spring means urging said pin means into engagement with said guide surface; moving means operatively connected to said pin means for moving the same at a given rate of speed along said shaft and guide surface; and adjustment means located adjacent to said pin means for causing the latter to engage said guide surface at a predetermined point along the length thereof so as to thereby control the duration of contact between said guide surface and pin means, said spring means rotating said shaft in said opposite direction so as to thereby cause said shutter operating member to move into said shutter closing position when said pin means moves beyond said guide surface.

7. In a camera, in combination, a shutter operating means movable between a shutter opening position and a shutter closing position; a rotatably mounted shaft operatively connected to said shutter operating means for moving the same between said two positions, said shaft being rotatable in one direction to move said shutter operating means into said shutter opening position and being rotatable in a direction opposite to said one direction for moving said shutter opening means into said shutter closing position; spring means operatively connected to said shaft for urging the same in said opposite direction of rotation; stationary guide means located adjacent to said shaft and having a guide surface extending in a direction parallel to said shaft; pin means mounted on said shaft only for sliding movement along the length thereof, said spring means urging said pin means into engagement with said guide surface; moving means operatively connected to said pin means for moving the same at a given rate of speed along said shaft and guide surface; and adjustment means located adjacent to said pin means for causing the latter to engage said guide surface at a predetermined point along the length thereof so as to thereby control the duration of contact between said guide surface and pin means, said spring means rotating said shaft in said opposite direction so as to thereby cause said shutter operating member to move into said shutter closing position when said pin means moves beyond said guide surface; and manually operable means operatively connected to said shaft for rotating the same in said one direction so as to move said shutter operating means into said shutter opening position, said rotation of said shaft in said one direction by said manually operable means tensioning said spring means so as to urge said pin means against said guide surface and so as to urge said shaft in said opposite direction of rotation.

8. In a camera, in combination, a shutter operating means movable between a shutter opening position and a shutter closing position; a rotatably mounted shaft operatively connected to said shutter operating means for moving the same between said two positions, said shaft being rotatable in one direction to move said shutter operating means into said shutter opening position and being rotatable in a direction opposite to said one direction for moving said shutter opening means into said shutter closing position; spring means operatively connected to said shaft for urging the same in said opposite direction of rotation; stationary guide means located adjacent to said shaft and having a guide surface extending in a direction parallel to said shaft; pin means mounted on said shaft only for sliding movement along the length thereof, said spring means urging said pin means into engagement with said guide surface; moving means operatively connected to said pin means for moving the same at a given rate of speed along said shaft and guide surface; and adjustment means located adjacent to said pin means for causing the latter to engage said guide surface at a predetermined point along the length thereof so as to thereby control the duration of contact between said guide surface and pin means, said spring means rotating said shaft in said opposite direction so as to thereby cause said shutter operating member to move into said shutter closing position when said pin means moves beyond said guide surface, said adjustment means comprising an abutment member located at least partially about said shaft and mounted for movement in a direction parallel to the axis of said shaft, and operating means operatively connected to said abutment member for locating the same at a desired position along said shaft, said abutment member being located between said shaft and said guide surface and said spring means urging said pin means toward said abutment member, whereby the location of said abutment member along said shaft causes said pin means to engage said guide surface at a desired point.

9. In a camera, in combination, a shutter operating means movable between a shutter opening position and a shutter closing position; a rotatably mounted shaft operatively connected to said shutter operating means for moving the same between said two positions, said shaft being rotatable in one direction to move said shutter operating means into said shutter opening position and being rotatable in a direction opposite to said one direction for moving said shutter operating means into said shutter closing position; spring means operatively connected to said shaft for urging the same in said opposite direction of rotation; stationary guide means located adjacent to said shaft and having a guide surface extending in a direction parallel to said shaft; pin means mounted on said shaft only for sliding movement along the length thereof, said spring means urging said pin means into engagement with said guide surface; moving means operatively connected to said pin means for moving the same at a given rate of speed along said shaft and guide surface; an adjustment means located adjacent to said pin means for causing the latter to engage said guide surface at a predetermined point along the length thereof so as to thereby control the duration of contact between said guide surface and pin means, said spring means rotating said shaft in said opposite direction so as to thereby cause said shutter operating member to move into said shutter closing position when said pin means moves beyond said guide surface, said adjustment means comprising an abutment member located at least partially about said shaft and mounted for movement in a direction parallel to the axis of said shaft, and operating means operatively connected to said abutment member for locating the same at a desired position along said shaft, said abutment member being located between said shaft and said guide surface and said spring means urging said pin means toward said abutment member, whereby the location of said abutment member along said shaft causes said pin means to engage said guide surface at a desired point; and manually operable means operatively connected to said shaft for rotating the same in said one direction so as to move said shutter operating means into said shutter opening position, said rotation of said shaft in said one direction by said manually operable means tensioning said spring means so as to urge said pin means against said guide surface and so as to urge said shaft in said opposite direction of rotation.

10. In a camera, in combination, a shutter operating means movable between a shutter opening position and a shutter closing position; a rotatably mounted shaft operatively connected to said shutter operating means for moving the same between said two positions, said shaft being rotatable in one direction to move said shutter operating means into said shutter opening position and being rotatable in a direction opposite to said one direction for moving said shutter operating means into said shutter closing position; spring means operatively connected to said shaft for urging the same in said opposite direction of rotation; stationary guide means located adjacent to said shaft and having a guide surface extending in a direction parallel to said shaft; pin means mounted on said shaft only for sliding movement along the length thereof, said spring means urging said pin means into engagement with said guide surface; moving means operatively connected to said pin means for moving the same at a given rate of speed along said shaft and guide surface; adjustment means located adjacent to said pin means for causing the latter to engage said guide surface at a predetermined point along the length thereof so as to thereby control the duration of contact between said guide surface and pin means, said spring means rotating said shaft in said opposite direction so as to thereby cause said shutter operating member to move into said shutter closing position when said pin means moves beyond said guide surface; film driving means located adjacent to said shaft; and control means operatively connected to said stationary guide means and pin means for controlling the length of film driven by said film driving means.

11. In a camera, in combination, a shutter operating means movable between a shutter opening position and a shutter closing position; a rotatably mounted shaft operatively connected to said shutter operating means for moving the same between said two positions, said shaft being rotatable in one direction to move said shutter operating means into said shutter opening position and being rotatable in a direction opposite to said one direction for moving said shutter operating means into said shutter closing position; spring means operatively connected to said shaft for urging the same in said opposite direction of rotation; stationary guide means located adjacent to said shaft and having a guide surface extending in a direction parallel to said shaft; pin means mounted on said shaft only for sliding movement along the length thereof, said spring means urging said pin means into engagement with said guide surface; moving means operatively connected to said pin means for moving the same at a given rate of speed along said shaft and guide surface; adjustment means located adjacent to said pin means for causing the latter to engage said guide surface at a predetermined point along the length thereof so as to thereby control the duration of contact between said guide surface and pin means, said spring means rotating said shaft in said opposite direction so as to thereby cause said shutter operating member to move into said shutter closing position when said pin means moves beyond said guide surface; film driving means located adjacent to said shaft; and control means operatively connected to said stationary guide means and pin means for controlling the length of film driven by said film driving means, said control means comprising an elongated member mounted for movement in a direction parallel to the length of said shaft and being located adjacent to said guide means and extending beyond an end thereof, setting means operatively connected to said elongated member for locating a predetermined length thereof beyond said end of said guide means, and cam means connected to said pin means for operating said film drive means, said spring means moving said cam means into engagement with the film drive means so as to set the latter into operation and said spring means urging said pin means into engagement with said elongated member when said pin means moves beyond said guide surface, said moving means moving said pin means along said elongated member at said given rate of speed so as to maintain said cam means in engagement with said film drive means during the time that said pin means is in engagement with said elongated member.

ANDRÉ VICTOR LEON CLEMENT DEBRIE.

References Cited in the file of this patent

UNITED STATES PATENTS

| Number | Name | Date |
|---|---|---|
| 1,166,120 | Fox | Dec. 28, 1915 |
| 1,388,870 | Lipp | Aug. 30, 1921 |
| 2,048,439 | Fairchild | July 21, 1936 |
| 2,408,811 | Resk | Oct. 8, 1946 |
| 2,496,329 | Breichle et al. | Feb. 7, 1950 |